(12) United States Patent
McCurdy (10) Patent No.: US 9,682,638 B1
(45) Date of Patent: Jun. 20, 2017

(54) UNATTENDED CHILD DETECTION SYSTEM AND METHOD

(71) Applicant: Marta Janine McCurdy, San Jose, CA (US)

(72) Inventor: Marta Janine McCurdy, San Jose, CA (US)

( * ) Notice: Subject to any disclaimer, the term of this patent is extended or adjusted under 35 U.S.C. 154(b) by 0 days.

(21) Appl. No.: 14/821,083

(22) Filed: Aug. 7, 2015

Related U.S. Application Data (60) Provisional application No. 62/079,445, filed on Nov. 13, 2014, provisional application No. 62/035,326, filed on Aug. 8, 2014.

(51) Int. Cl.
*B60N 2/00* (2006.01)
*G08B 21/24* (2006.01)
*B60W 40/08* (2012.01)

(52) U.S. Cl.
CPC ............. *B60N 2/002* (2013.01); *G08B 21/24* (2013.01); *B60W 2040/0881* (2013.01)

(58) Field of Classification Search
CPC ................................. B60N 2/002; G08B 21/24
See application file for complete search history.

(56) References Cited

U.S. PATENT DOCUMENTS

| | | |
|---|---|---|
| 6,922,147 B1 | 7/2005 | Viksnins et al. |
| 6,924,742 B2 | 8/2005 | Mesina |
| 7,714,737 B1 | 5/2010 | Morningstar |
| 8,063,788 B1 | 11/2011 | Morningstar |
| 8,768,292 B2 | 7/2014 | Welch |
| 2013/0109342 A1 | 5/2013 | Welch |
| 2014/0361889 A1* | 12/2014 | Wall, II ................ G08B 21/025 340/539.11 |

* cited by examiner

*Primary Examiner* — Leon Flores
(74) *Attorney, Agent, or Firm* — Patent Law Offices Michael E. Woods; Michael E. Woods (57) ABSTRACT

A pressure-sensitive pad is installed either between a child car seat and the vehicle seat OR between the child and the child car seat that communicates with an alerting system. This pad includes a pressure sensor, a battery, a stored program computing system having a processor executing instructions from a, and communications system compatible with the alerting system. The alerting system is a wireless system that both measures a proximity of the responsible party to the pressure pad and issues an indication (e.g., one or more of an audio, visual, haptic, vibratory, and the like signal(s)) that a proximity (e.g., local geo-fence around the pad) distance has been exceeded AND that the child remains in the child seat. The alerting system may be installed in an alert system that is part of a portable electronic device (e.g., smartphone) or a special module (e.g., key fob).

6 Claims, 6 Drawing Sheets

UNATTENDED CHILD DETECTION SYSTEM AND METHOD

CROSS REFERENCE TO RELATED APPLICATIONS

This application claims benefit of U.S. Patent Application No. 62/035,326 filed 8 Aug. 2014 and also claims benefit of U.S. Patent Application No. 62/079,445 filed 13 Nov. 2015, the contents of which are hereby expressly incorporated by reference thereto in their entireties for all purposes.

FIELD OF THE INVENTION

The present invention relates generally to detection of an unattended child, and more specifically, but not exclusively, to detection and alerting of an unattended child left in a child seat in a passenger vehicle.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

It is common to place a young child into a child safety seat when transporting the child using a passenger vehicle. It is sometimes the case that a parent, guardian, caregiver, custodian, or attendant (collectively "responsible party") to a young child inadvertently leaves the child unattended in the safety seat when exiting the vehicle.

For many consumer products that include portability and ease of use, one or more components may desirably be equipped with portable power (e.g., batteries and the like). A useful product that consumers would otherwise enjoy can easily become undesirable if power consumption is too great so that batteries would need to be replaced frequently. For a safety product, failure of the device of function because of batteries have insufficient stored energy is more than inconvenient as it risks a failure mode of failing to provide the expected protection. The more frequently that the batteries need to be replaced increases an associated risk of failure of the safety system.

Another concern associated with wireless communications products relates to operational range. There are many permutations of vehicle types, energy levels, antenna orientation and other factors that can significantly affect a wireless communications range that some solutions work in one context but may fail in other contexts. Further, in similar contexts, not all consumers will agree on an optimum operational parameters, such as triggering range, among other parameters.

What is needed is a system and method for alerting a responsible party when a child has been left unattended in a safety seat operable in a consumer-friendly manner.

BRIEF SUMMARY OF THE INVENTION

Disclosed is a system and method for alerting a responsible party when a child has been left unattended in a safety seat operable in a consumer-friendly manner.

The following summary of the invention is provided to facilitate an understanding of some of technical features related to detection and alerting systems for unattended children, and is not intended to be a full description of the present invention. A full appreciation of the various aspects of the invention can be gained by taking the entire specification, claims, drawings, and abstract as a whole. The present invention is applicable to other environments in addition to passenger vehicles as well as applicable to other systems in addition to child safety seats.

Configuration—a pressure-sensitive pad is installed either between a child car seat and the vehicle seat OR between the child and the child car seat that communicates with an alerting system. This pad includes a pressure sensor, a battery, a stored program computing system having a processor executing instructions from a, and communications system compatible with the alerting system. The alerting system is a wireless system that both measures a proximity of the responsible party to the pressure pad and issues an indication (e.g., one or more of an audio, visual, haptic, vibratory, and the like signal(s)) that a proximity (e.g., local geo-fence around the pad) distance has been exceeded AND that the child remains in the child seat. The alerting system may be installed in an alert system that is part of a portable electronic device (e.g., smartphone) or a special module (e.g., key fob).

Operation—the pressure sensor is placed into position for detecting the child (e.g., under the seat or in the child seat). The child is seated in the child seat on top of the active sensor (directly or indirectly as noted). This initial seating issues a quick non-alarm alert to signal that the safety system is active. As long as the alerting system does not detect a separation of the responsible party (the portable device associated with the pad and with the responsible party) from the pad while the pressure sensor detects the presence of the child, then no alert is issued. The alerting system periodically polls the separation distance and state of the pressure sensor and if/when the separation distance is exceeded while the pressure sensor is loaded, an indication is issued to the responsible party. This duty cycle may be varied to conserve battery consumption appropriately while also providing desired responsiveness on alert triggering.

Power consumption of the in-vehicle electronics assembly is configured to enable use of a single CR240 coin cell battery with an estimated usage (usage=child seated in safety seat with warning system active) of twenty (20) hours per week providing an estimated twenty (20) months of operation. Some embodiments may provide a less preferred implementation for a wired power connection, such as to an inboard power tap (cigarette lighter socket or other outlet).

Antenna design and selection has enabled an improved maximum possible range with an associated application on a portable electronic device (e.g., a smartphone application or app) permits a user to set a desired triggering proximity range as a fraction (less than 1.0) of the maximum range.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Embodiments of the present invention provide a system and method for alerting a responsible party when a child has been left unattended in a safety seat operable in a consumer-friendly manner. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

DEFINITIONS

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The following definitions apply to some of the aspects described with respect to some embodiments of the invention. These definitions may likewise be expanded upon herein.

As used herein, the term "or" includes "and/or" and the term "and/or" includes any and all combinations of one or more of the associated listed items. Expressions such as "at least one of," when preceding a list of elements, modify the entire list of elements and do not modify the individual elements of the list.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise. It will be understood that when an element is referred to as being "on" another element, it can be directly on the other element or intervening elements may be present therebetween. In contrast, when an element is referred to as being "directly on" another element, there are no intervening elements present.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "connect," "connected," and "connecting" refer to a direct attachment or link. Connected objects have no or no substantial intermediary object or set of objects, as the context indicates.

As used herein, the terms "couple," "coupled," and "coupling" refer to an operational connection or linking. Coupled objects can be directly connected to one another or can be indirectly connected to one another, such as via an intermediary set of objects.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

As used herein, the term "responsible party" refers to a parent, guardian, caregiver, custodian, attendant, or other person having or exercising a protective duty to a young child secured within a compartment, such as seated in a child safety seat installed in a passenger vehicle.

Figure 1:
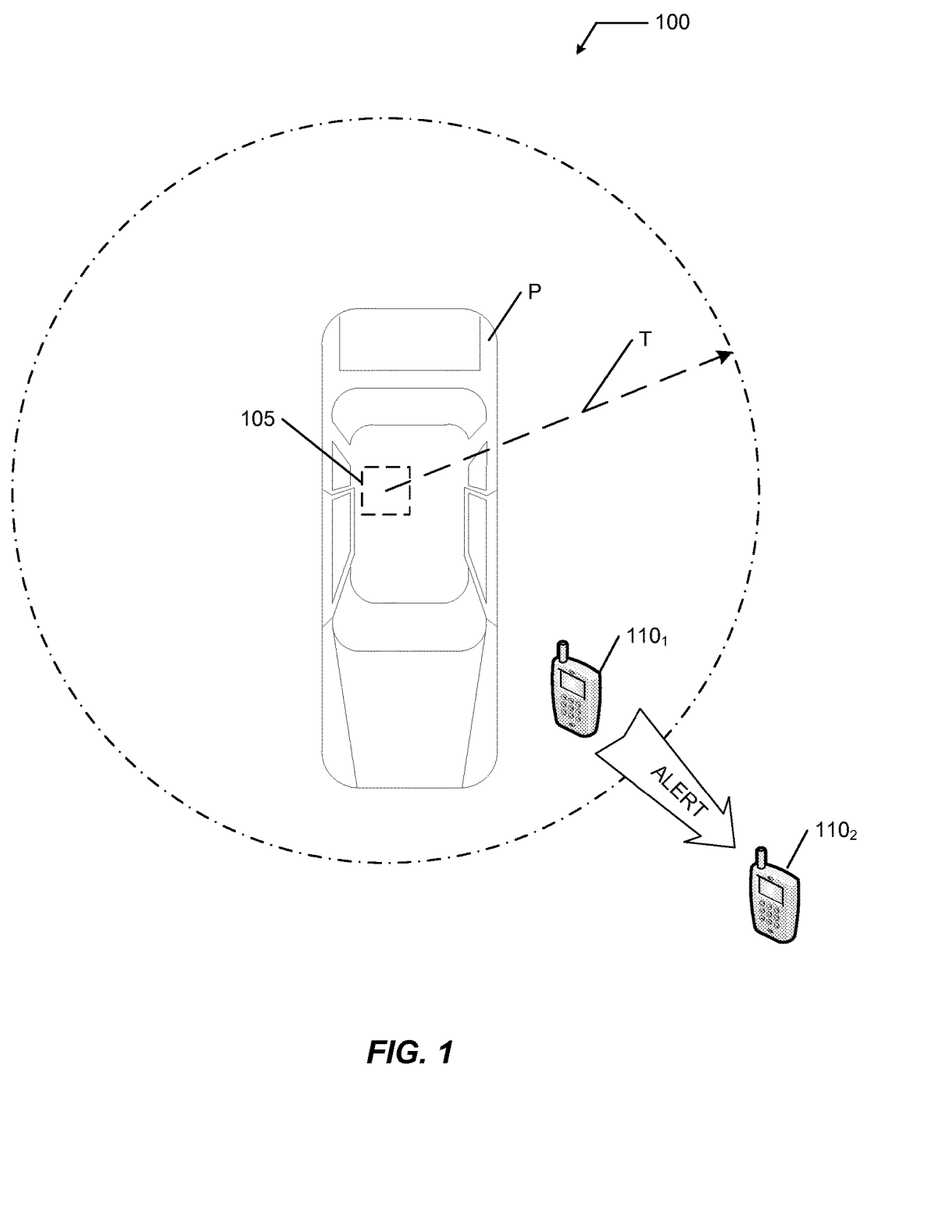
FIG. 1 illustrates an overhead plan view of an alerting system.
Figure 2:
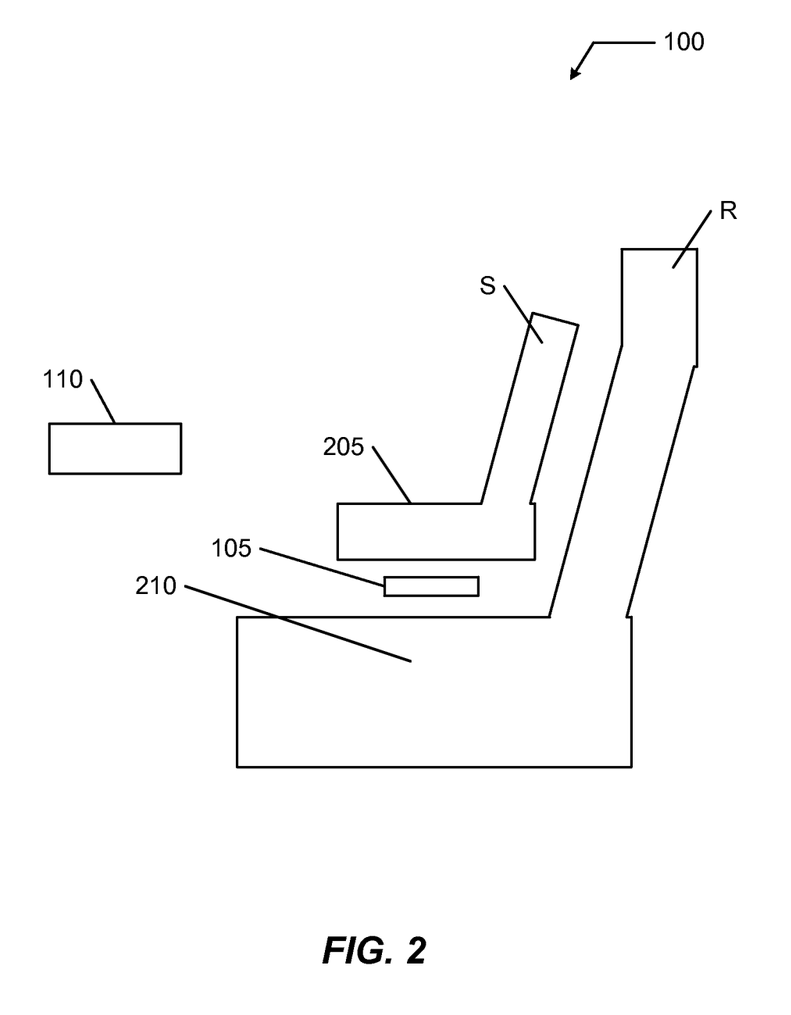
FIG. 2 illustrates a side elevation view of the alerting system of FIG. 1.

FIG. 1 illustrates an overhead plan view of an alerting system 100 and FIG. 2 illustrates a side elevation view of alerting system 100. Alerting system 100 is operated in association with a passenger vehicle P having a child safety seat S installed on a rear seat R. Alerting system 100 includes a pressure pad 105 and a portable electronic device 110. As further explained below, there is an association between pressure pad 105 and portable electronic device 110. This association is a ranging association and is measured against a distance threshold T measured from pressure pad 105. Portable electronic device 110 is illustrated in a pair alternative modes (the devices are physically the same device but disposed at different distances from pressure pad 105)—a proximated mode (portable electronic device $110_1$) and a separated mode (portable electronic device $110_2$). Proximated mode includes portable electronic device $110_1$ within distance threshold T and separated mode includes portable electronic device $110_2$ outside distance threshold T. Portable electronic device 110 includes an indicator system (one or more of a visual, audio, haptic, vibratory, and/or other signaling mechanism) that is triggered to provide an alert when the proximated mode of portable electronic device $110_1$ changes to the separated mode of portable electronic device $110_2$.

Pressure pad 105 includes a sensing system having a load cell. Other embodiments may include a switch (e.g., a dome switch or the like) as an alternative. Pressure pad 105 may be small, for example two inches by two inches and about as thick as a printed circuit board. Pressure pad 105 may optionally be installed into a protective pouch or container, such as a pouch having a child-friendly theme (a face of a puppy for example).

Portable electronic device 110 may be implemented in a smart phone, cell phone, tablet, personal digital assistance, key fob, or the like. The indicating system is appropriate for the implementation; a key fob implementation may generate an audio indication signal (e.g., beeping, chirping, siren, or the like) while a smart phone implementation may include many indication modes such as those used to alert a user to an urgent phone call, urgent message, or other urgent notification, through one or more of audio, visual, and vibratory cues. It is preferred that the indication system sustain an easily perceptible alert each time portable electronic device $110_1$ transitions from the proximated mode to portable electronic device $110_2$ in the separated mode. It is more preferable that this easily perceptible alert be sustained for as long as portable electronic device $110_2$ is in the separated mode.

Pressure pad 105 is installed between rear seat R and safety seat S to detect a weight of a child secured within safety seat S. Alternate installations include placement of pressure pad 105 on top of a safety seat portion 205 of safety seat or integrated within safety seat portion 205 or within a rear seat portion 210 of rear seat R. The first two installations include retrofit implementations of alerting system 100 and the latter two installations include original equipment manufacturer integrations.

Pressure pad 105 detects when a child is secured within safety seat S. There are a range of solutions that may be used to detect when this condition is satisfied, including configuring pressure pad 105 for measuring weight changes. These weight changes may include preset options that reflect the installation mode and typical ranges of children using safety seat R. Alternatively these weight changes may be customized with a specific weight for those specific children using safety seat R.

Pressure pad 105 is associated with portable electronic device 110 and wireless communications systems establish a separation distance D between pressure pad 105 and portable electronic device 110. An optional feature of portable electronic device, particularly when the system has been designed to have a very large possible separation distance D, is to allow the user/operator to set the triggering distance based upon user preferences. That is, some users may prefer to have a relatively large distance (at or close to max distance) to allow the user to re-enter a home after securing the child to collect an object left behind without triggering the alarm function. Some users may prefer a shorter triggering distance and set the separation distance D to a relatively small value significantly less than the max to provide for quick alarm operation.

Thereafter, whenever the responsible party carries portable electronic device 110 past distance threshold T and portable electronic device 110 transitions to the separated mode, alerting system 100 will cause the indicating system of portable electronic device 110 to inform the responsible party that they have moved further that the distance threshold T from the child secured within safety seat S.

When a child is first seated in safety seat S and positioned above a load-detecting portion of pressure pad 105, pressure pad 105 optionally causes portable electronic device 110 to issue a short alert providing notification that the system is active.

Figure 3:
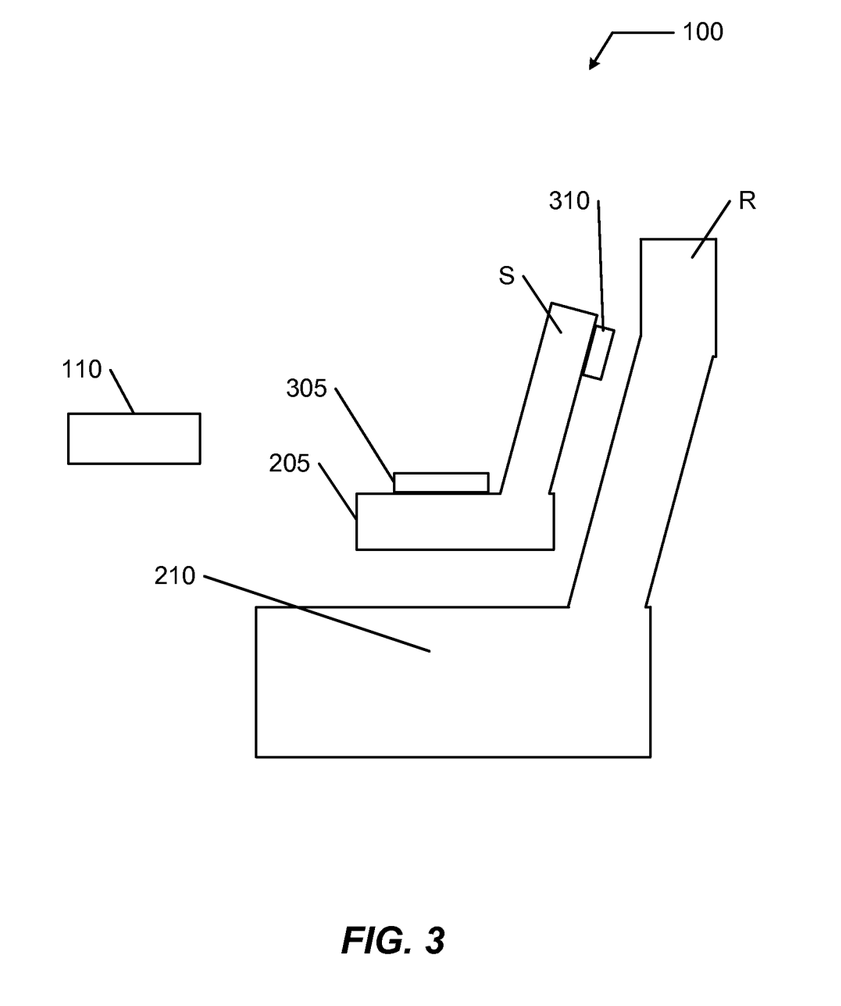
FIG. 3 illustrates a side elevation view of an alternative implementation of the alerting system of FIG. 1.

FIG. 3 illustrates a side elevation view of an alternative preferred implementation to alerting system 100 in which pressure pad 105 includes a sensing system 305 communicated (e.g., wirelessly) to communications system 310. In this implementation, the separation of pressure pad 105 into multiple discrete units permits superior placement and operation.

Sensing system 305 includes a load detector (load cell, pressure switch or the like) wirelessly communicated to communications system 310. Communications system 310 is an inboard (mounted inside the passenger vehicle proximate to the load detector, more preferably a small electronics package that may be attached to a back of safety seat S) electronics communications system.

Sensing system 305 may be small, for example two inches by two inches and about as thick as a printed circuit board and capable of detecting small changes in loading (for example, detecting one pound or more loading). Sensing system 305 may optionally be installed into a protective pouch or container, such as a pouch having a child-friendly theme (a face of a puppy for example). This pouch, in turn, may be placed under a padded seat of safety seat S, or in some embodiments, on top of the seat. This placement is advantageous for detecting a presence of a child secured into safety seat S. It is not necessarily an optimum location for transmitting a low power wireless signal to optimum range outside of the vehicle because of the metal sidewalls and location close to the chassis.

Communications system 310 includes a low power electronics system that communicates with both sensing system 305 and portable device 110. It may advantageously be mounted high up on the backside of safety seat S to improve communications range to portable device 110. (Mounting may be made in any of numerous ways, including, for example, use of a hook and loop fastening system and the like to secure communications system 310 to the top back of safety seat S.) An antenna of communications system 313 is optimized to increase its maximum range to portable device 110.

Figure 4:
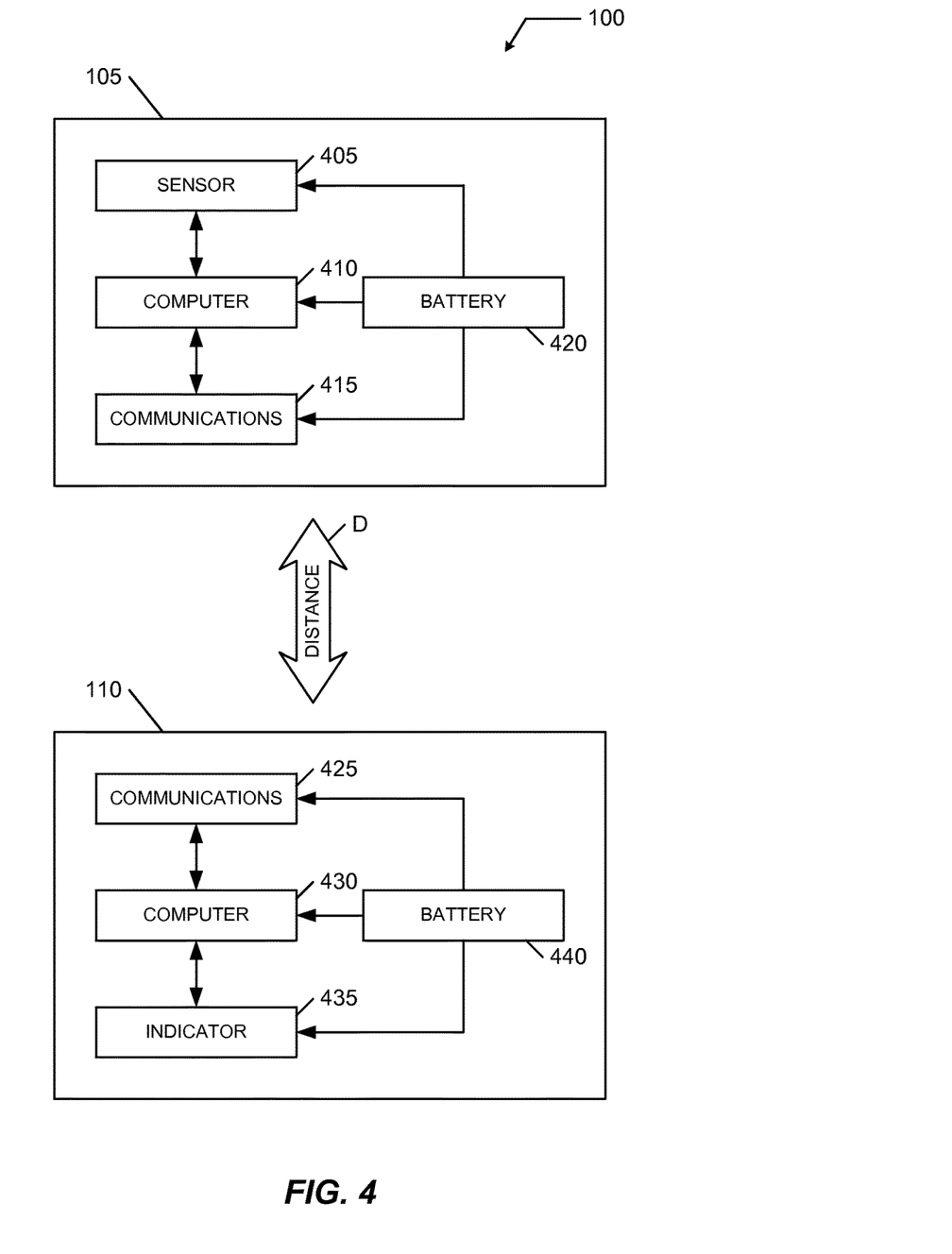
FIG. 4 illustrates a schematic view of the alerting system of FIG. 1.

FIG. 4 illustrates a schematic view of the alerting system of FIG. 1. Alerting system 100 includes pressure pad 105 associated with portable electronic device 110. Pressure pad 105 has a number of components, integrated together or divided into sub-systems, including a sensor 405 coupled to a stored program computing system 410 that in turn controls a communications system 415. An energy storage system 420 powers these components.

Sensor 405 may be implemented in many different ways, e.g., a switch (e.g., a dome switch), or transducer, to convert variations in pressure or force into an electrical signal that may be used by computing system 410. Sensor 405 includes a pressure sensor or load cell in the illustrated embodiment.

Computing system 410 may be implemented in many different ways and typically includes a microprocessor, microcontroller, or other processor that accesses and executes computer program instructions retrieved from a memory for controlling and monitoring pressure pad 105 and alerting system 100 as described herein.

Communications system 415 includes a wireless communication system configured to exchange information, data, signals, states, and the like between pressure pad 105 and portable electronic device 110. In a preferred embodiment, this wireless solution includes a radiofrequency (RF) solution combined with a locating position (e.g., global positioning system or the like) that enables alerting system 100 to establish a relative separation distance D between pressure pad 105 and portable electronic device 110 using a micro antenna. Alerting system 100 compares separation distance D against separation threshold T to determine whether portable electronic device 110 is in the proximated mode or the separated mode. In one implementation, the separation threshold is selected from a range of 15-50 feet. In some cases the range may be set nominally by the user but subject to RF signal strength variations, attenuations, and distortions.

Energy storage system 420 may include a battery, ultra-capacitor, or other similar energy storage solution sufficient for the energy needs over a desired operating period of pressure pad 105 prior to recharging or replacement.

Portable electronic device 110 has a number of components including a communications system 425 coupled to a stored program computing system 430 that in turn controls an indicator 435. An energy storage system 440 powers these components.

Communications system 425 includes a wireless communication system configured to exchange information, data, signals, states, and the like between pressure pad 105 and portable electronic device 110. In a preferred embodiment, this wireless solution includes a radiofrequency (RF) solution combined with a locating position (e.g., global positioning system or the like) that enables alerting system 100 to establish a relative separation distance D between pressure pad 105 and portable electronic device 110 using a micro antenna. Alerting system 100 compares separation distance D against separation threshold T to determine whether portable electronic device 110 is in the proximated mode or the separated mode. There may be different implementations having the communications system being one of a transceiver, a receiver, and/or a transceiver appropriate for the desired information flow in alerting system 100.

Computing system 430 may be implemented in many different ways and typically includes a microprocessor, microcontroller, or other processor that accesses and executes computer program instructions retrieved from a memory for controlling and monitoring portable electronic device 110 and alerting system 100 as described herein.

Indicator 435 implements the indicating function described herein for alerting system 100. The particular type of indication is implementation specific and depends upon the details of the configuration of portable electronic device 110. Indicator 435 may include one or more a display, light, a transducer (audio and/or vibratory indication), or other notification modality to provide a warning to the responsible party that portable electronic device $110_2$ is in the separated mode.

Energy storage system 440 may include a battery, ultra-capacitor, or other similar energy storage solution sufficient for the energy needs over a desired operating period of portable electronic device 110 prior to recharging or replacement.

Figure 5:
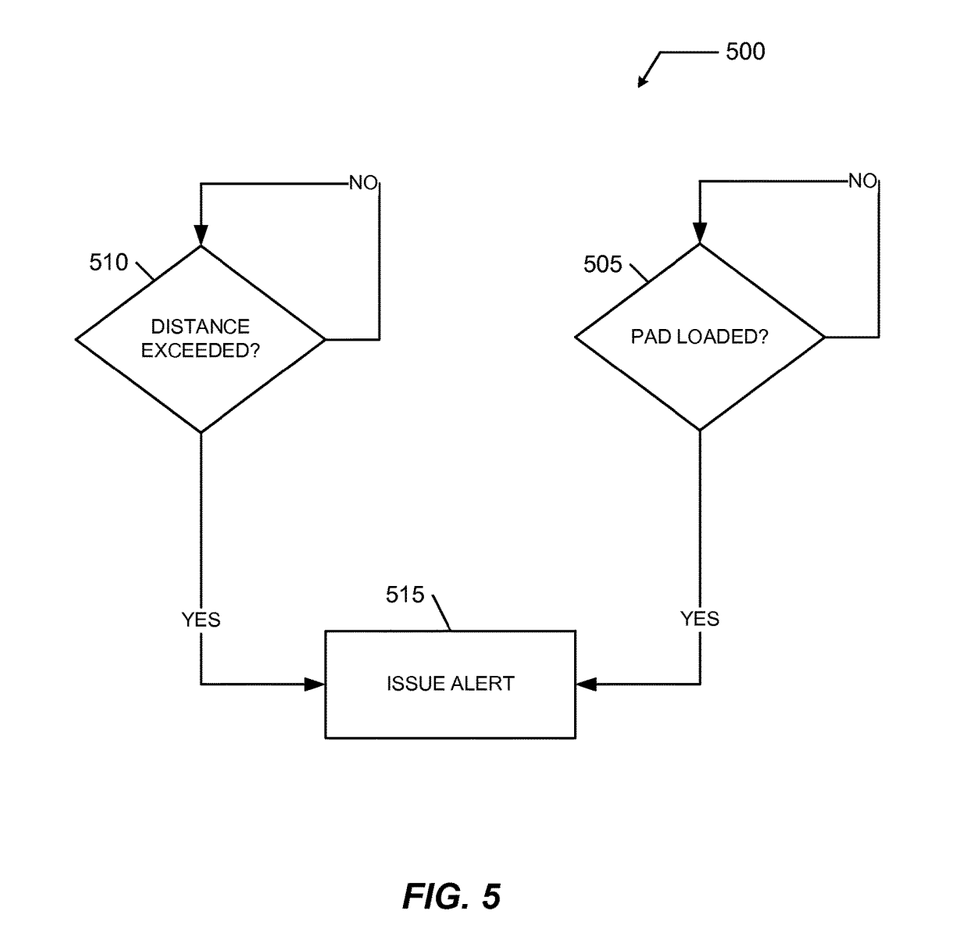
FIG. 5 illustrates a state process for the alerting system of FIG. 1.

FIG. 5 illustrates a state process 500 for the alerting system of FIG. 1. State process 500 may be implemented by one or both of computing systems of alerting system 100 and includes a pair of polling processes: a pad loaded process 505 and a distance exceeded process 510.

Pad loaded process 505 periodically establishes whether pressure pad 105 is loaded, indicating whether a child is secured within safety seat S. Pad loaded process 505 includes two different states: A "NO" state for a not loaded state of pressure pad 105 and a "YES" state for a loaded state of pressure pad 105.

Distance exceeded process 510 periodically establishes the separation distance D against the distance threshold T, indicating whether portable electronic device 110 (and the responsible party carrying portable electronic device 110) exceed distance threshold T. Distance exceeded process 510 includes two different states: A "NO" state for a proximated modal state of portable electronic device 110 and a "YES" state for a separated modal state of portable electronic device 110.

State process 500 further includes an issue alert process 515 that is active whenever both pad loaded process 505 is "YES" and distance exceeded process 510 is "YES" to indicate that a child is secured within safety seat S AND portable electronic device 110 is in the separated mode. Issue alert process 515 causes alerting system 100 to actuate indicator 435 and inform the responsible party of this situation.

Figure 6:
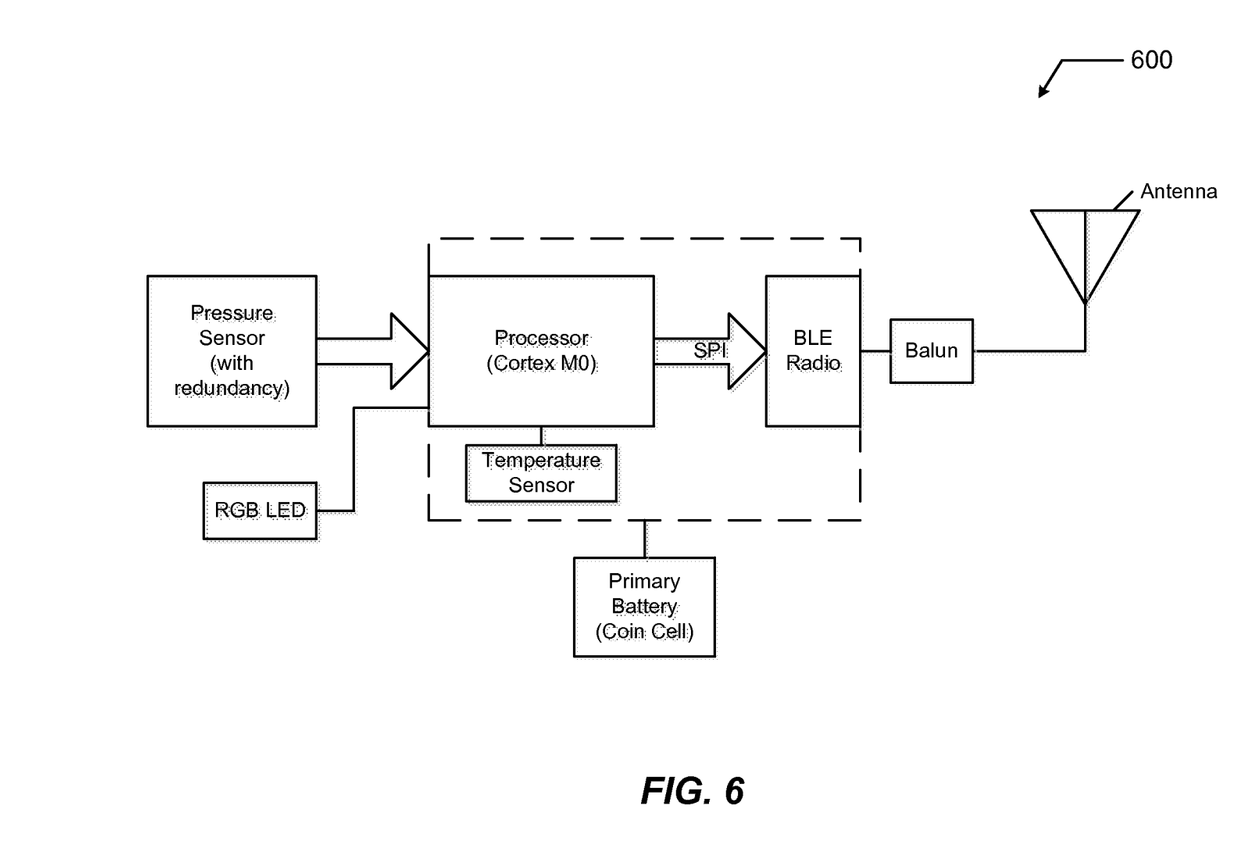
FIG. 6 illustrates a schematic block diagram of a representative communications system for use in the alerting system of FIG. 1.

FIG. 6 illustrates a schematic block diagram of a representative communications system 600 for use in alerting system 100. Communications system 600 is part of a device attached to baby seat S and indicates its occupancy status. Communications system 600 utilizes Bluetooth® Low Energy (BTLE) as the communication method, but other implementations may adapt additional or other protocols as part of the communication method. BTLE is a protocol that is designed to provide information about a device in a hierarchical manner. The basic idea is a server provides information (services) about itself to a client and can then send/receive information described by those services (characteristics). The following describes the application, services and characteristics for the baby seat device. BTLE was adopted as part of Bluetooth® Core Specification Core Version 4 on 30 Jun. 2010 and included in Bluetooth® Core Specification 4.1 adopted 3 Dec. 2013 by, and available from, the Bluetooth® Special Interest Group—the contents of these specifications are hereby expressly incorporated in their entireties by reference thereto.

Part of communications system 600 is a BTLE application that resides on a portable electronic device that supports BTLE, such as an iOS, Android, or other device). Current BTLE support for many portable electronic devices is included with iOS versions and Android version 4.3 and above. Other devices that support BTLE may be used, and other wireless protocols may be adapted and provide the same or similar features and operation as described herein.

BTLE Application

The BTLE application of the embodiment described herein will have the features of Table I.

TABLE I

BTLE Application Features

| Feature | GUI example |
|---|---|
| Detect a baby seat server | Check if in accept/reject lists, and connect if in accept list, ignore if in reject list, and ask to accept/reject if in neither (and add to proper list). |
| Device's battery is low | Short beep + Display popup indicating low battery |
| Seat becomes occupied | Optional beep (ex. increasing pitch) device is turned on!!! |
| Seat becomes unoccupied | Optional beep (ex. Decreasing pitch) |
| Device goes out of range with seat occupied | Alarm *important* and popup |
| Device goes out of range with seat unoccupied | Happy beep |
| Temperature exceeds limit with seat occupied | Alarm *important* and popup |
| Device disconnected with seat occupied | Alarm *important* and popup |
| Alarm acknowledge | Push button |
| Set distance calibration & threshold | Set at desired distance w. push button |
| Set temperature threshold | Automatic or manual Input box |
| Select units | Degrees: Celsius or Fahrenheit; Distance: feet or meters |

BTLE Server

The BTLE server is the device that is attached to the baby seat. It contains pressure & temperature sensors. It sends information to the client. The server turns on when the pressure on the baby seat sensor exceeds a certain value (a pound or two). This causes a wakeup signal to the CPU, and exits deep sleep mode.

The server will then try to connect to a client by advertising the device name "BabySeat" (for now—though other names may be used) and the private UUID of the server application. When connected, the server will send the pressure, temperature, battery level, and RSSI signal strength to the client. The data will be updated at the beginning of a connection and as a power saving technique, whenever a value changes (i.e. if the temperature is stable, it won't keep sending the same number all the time). When the sensor detects no weight, the device tells the connected client that the seat is unoccupied and then disconnects. It then goes back into deep sleep mode.

BTLE Client

The BTLE client is a smart phone or keyfob. The smart phone interface is described in the BTLE Application section. It receives the notifications from the baby seat. It both receives RSSI (signal strength) from the server and locally to calculate distance from baby seat. If a smart phone, it can set the thresholds to the server.

BTLE Low Level Protocol

Most of the low level protocol handling is performed by the device hardware. It requires some information to start communication. Each BTLE device has a MAC-64 address, containing a unique value for low level communication. A power level indicates how much power goes into transmitting data.

| Item | Value | Description |
|---|---|---|
| Address | Mac-64 | Low level address for the device |
| Transmit power | Number | Transmit power the device is using |

BTLE Addressing

It also contains several universal unique identifiers (UUIDs) for each characteristic and service listed below. A UUID can come in 3 different forms. The main form is a 128-bit value indicating the full or non-BTLE assigned values. BTLE only uses the 16 and 128 bit forms. These values can be generated in a random or pseudo random manner. External tools exist to create them. The short forms are subsets for assigned values and must be registered with Bluetooth.

| Form | Range | Full value (hex) |
|---|---|---|
| Full | all | xxxxxxxx-xxxx-xxxx-xxxx-xxxxxxxxxxxx |
| 16-bit | 0-65535 | 0000xxxx-0000-1000-8000-00805F9B34FB |
| 32-bit | $0-2^{32}-1$ | xxxxxxxx-0000-1000-8000-00805F9B34FB |

See, for example, www.bluetooth.org/en-us/specification/assigned-numbers for the list of assigned numbers. The device will use assigned numbers if they exist, and proprietary (full form) if not.

BTLE Service

The BTLE service is the combined set of characteristics. There are several types of services, specifying what is available on the device and the device conditions. Each of The tables below are defined for a specific service. Some services are mandatory in BTLE. When a client connects to a server, these services and their corresponding characteristics are sent to the client, indicating the capabilities of the server.

BTLE provides profiles, a set of standardized interfaces. In some implementations, it may be desirable for the requirements for the baby seat be incorporated into the proximity and notification profiles.

BTLE Descriptors

BTLE descriptors contain optional auxiliary information about a characteristic. For example, the descriptors could define units of measurement. These are listed in the above tables.

BTLE Characteristics

The BTLE characteristics contain information passed to the client. The server has two types of characteristics, administrative and device. Some characteristics are mandatory in BTLE. Each characteristic has flags indicating how the value is to be handled. The read flag indicates the value can be read from the server. The write flag indicates a value can be sent to the server. The notify flag indicates that the value can be updated dynamically. Administrative characteristics contain general information about the device:

| Characteristic | Value | Type | Descriptor(s) |
|---|---|---|---|
| Generic Attribute Profile Service (GAP) Characteristics (administrative) | | | |
| Service changed | ? | Read + Indicate | |
| Generic Access Service Characteristics (administrative) | | | |
| Device Name | BabySeat | read | |
| Appearance | Unknown | read | |
| Privacy | | read | |
| Reconnection Address | | read | |
| Connection Parameters | | read | |
| Device Information Service Characteristics (administrative, optional) | | | |
| Manufacturer Name | ? | Read | |
| Model Name | ? | Read | |
| Serial Number | ? | Read | |

BabySeat Service Characteristics

The Tx Power service indicates how much power is being transmitted from the server. This is essential in collecting the RSSI information for the client to determine the distance to the server. This may be handled in the lower protocol layers.

| Characteristic | Value | Type | Descriptor(s) |
|---|---|---|---|
| Tx Power Level | number | Read | |

The occupied signal used the notify mechanism is used to send an alert to the client. The percentage pressure may not be available in the h/w.

| Characteristic | Value | Type | Descriptor(s) |
|---|---|---|---|
| Occupied | True or false (Boolean) | Read, Notify | "Child present in car seat" |
| Pressure percentage | Pressure on sensor | Read | "Weight" |

The battery level is read by the on-chip ADC and converted to a percentage. This value is sent to the client to indicate when a battery change may be necessary. The battery voltage may be removed later once the battery is characterized and the percentage values are somewhat accurate.

| Characteristic | Value | Type | Descriptor(s) |
|---|---|---|---|
| Battery level | Percent | Read | "Percent" |
| Battery voltage | Millivolts | Read | "Battery Voltage" |

The temperature is important to know for generating an alert.

| Characteristic | Value | Type | Descriptor(s) |
|---|---|---|---|
| Temperature | Degrees | Read | "Celsius" |

Bonding:

BTLE servers can bond to a client. This allows automatic connection and security. The main requirements are to: support multiple car seat servers and support multiple clients. So the main method to not bond, but filter the advertisements on the device name and UUID. This means only clients with the application will see the device and react to the baby seat server. A potential problem for this method is all clients will react to all servers. Another method is white list advertising this provides a set of client addresses to connect to. This type of filtering can be done on either the client and/or the server. Initially the accept/reject list on the application is probably the easiest & fastest to implement.

Communication

GATT

BTLE devices exchange data using the Generic Attribute Profile (GATT) application programming interface. BTLE has a maximum amount of data it can send in a packet. This limit is well over the communication requirements of the device.

The sections above define the GATT protocol elements to communicate. The BTLE controller performs all the communication work once the microprocessor sends the information up to the BTLE controller. It is then up to the microprocessor to monitor and send information to the BTLE controller as conditions change. All this is done by HCI and ACI (below).

Generic Access Profile (GAP)

The Generic Access Profile (GAP) defines the role of a device. It makes/breaks connections and performs bonding. The communication part consists of the Generic Attribute Profile Service described above. The role defines how links are made. The roles include:

| | |
|---|---|
| Broadcaster | N/A |
| Observer | N/A |
| Peripheral | The baby seat device acts as the server |
| Central | The keyfob or smart phone who initiates the connection acts as the client |

One important part of BTLE is low energy. Broadcasting is a power hungry operation and is only on for a limited amount of time. The times will typically be about a minute for power on and optimized when no connection is available. The GAP protocol will then be to direct the services of the server to the appropriate receiver on the client.

HCI and ACI

The Host Controller Interface (HCI) is how the microprocessor communicates with the BTLE controller. It is a standard set of command and responses between the two devices. The Application Controller Interface (ACI) extends the HCI to allow controller specific applications. Bluetooth defines the HCI and the BTLE controller defines the ACI specification.

Basic Server Initialization:

Set the BTLE low level address; Set the BTLE startup power (for broadcasting advertisements during discovery); Initialize the GATT; Initialize the GAP, and Set the GATT services and characteristics.

Basic Server Operation:

Wait for a connection; Read battery, temperature, pressure, and client power information; Determine alert status from the above data; and Send status and alerts as required.

Immediate Alerts:

All ok:—No Alert

Battery low:—Mid Alert

Child in car seat and going out of range:—High Alert

UUID identifiers for the application. The pressure percentage may not be included, for example if the sensor aid is not included. The battery voltage is also extra information, but will be useful until the battery characteristics are determined.

| | |
|---|---|
| Advertised BabySeat service | 25bb935e-3960-405e-b7eb-c2f7e2a6b897 |
| Seat Occupied | 4010ef3a-4e91-492e-bb4d-0f086b886a7d |
| Temperature | da574d05-9a51-47fc-8aca-1cadaa7839d7 |
| Pressure % | 889f26af-a069-4730-beca-0424f2b89cbf |
| RSSI | 11494956-c401-4a9b-a9ba-9c87425882f0 |
| Battery % | 2A19 (16-bit assigned) |
| Battery Voltage | b37493ec-e694-4069-9f06-de86f108ad60 |
| available | 129d7252-d942-4ad7-aabb-c7a87e8cbc97 |
| available | 58b2c5dd-3d1b-44fb-a5f7-2e94d6ca8e23 |
| available | ae578690-6715-495f-b7cb-295de80b07fe |
| available | 56f2327b-f439-4674-99e2-3df3c4585ae2 |
| available | 84100420-b327-43dd-8669-5fb824fbefaa |
| available | 59ec181d-6e12-4b6b-aa07-8b7e0fcac955 |
| available | 31950f77-5b8f-4475-829e-aa063d0a0498 |
| available | e8764780-5ddc-4b60-ab59-54ae595d2099 |
| available | 4112bdfe-1523-47a1-a2dc-d8363a4d5b1a |
| available | e695e9c2-c0c3-4c09-8a84-7f1a65bea819 |

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. An apparatus for detecting unattended occupancy, by a user, of a safety seat associated with a vehicle seat, comprising:
   a first pressure detecting system, responsive to a mass of the user disposed within the safety seat, cooperatively physically coupled to the safety seat and the vehicle seat, said first pressure detecting system establishing an occupancy state for the safety seat; and
   an first alerting system, in a ranging association with said first pressure detecting system and responsive to said occupancy state, including a first portable electronic device evaluating a first separation distance between said first pressure detecting system and said first portable electronic device to establish a first proximity state for said first portable electronic device relative to said first pressure detecting system, said first alerting system providing a first indication responsive to a first indicator state that consists essentially of a first logical evaluation of said occupancy state and said first proximity state;
   wherein said first pressure detecting system and said first alerting system are each operated from energy provided by a battery, wherein said first pressure detecting system and said first alerting system employ a communications paradigm for exchanging data, and wherein said communications paradigm includes a power-conserving communications process;
   wherein said first alerting system includes a periodic poll of said occupancy state and said first proximity state and wherein said power-conserving communications process includes an implementation of a variable duty cycle controlling a frequency of said periodic poll;
   wherein said battery of said first pressure detecting system consists essentially of a coin cell battery, wherein an occupancy state of the safety seat includes 20 hour per week of active monitoring, and wherein said variable duty cycle is configured to achieve an estimated 20 months of operation of said first pressure detecting system.

2. An apparatus for detecting unattended occupancy, by a user, of a safety seat associated with a vehicle seat, comprising:
   a first pressure detecting system, responsive to a mass of the user disposed within the safety seat, cooperatively physically coupled to the safety seat and the vehicle seat, said first pressure detecting system establishing an occupancy state for the safety seat; and
   an first alerting system, in a ranging association with said first pressure detecting system and responsive to said occupancy state, including a first portable electronic device evaluating a first separation distance between said first pressure detecting system and said first portable electronic device to establish a first proximity state for said first portable electronic device relative to said first pressure detecting system, said first alerting system providing a first indication responsive to a first indicator state that consists essentially of a first logical evaluation of said occupancy state and said first proximity state;

wherein said first pressure detecting system and said first alerting system employ a communications paradigm for exchanging data, and wherein said communications paradigm includes a client-server communications process;

wherein said first pressure detecting system includes a first car seat server, wherein said first alerting system includes a first client and further comprising a second alerting system, in said ranging association with said first pressure detecting system and responsive to said occupancy state, including a second portable electronic device evaluating a second separation distance between said first pressure detecting system and said second portable electronic device to establish a second proximity state for said second portable electronic device relative to said first pressure detecting system, said second alerting system providing a second indication, independent from said first indication, responsive to a second indicator state that consists essentially of a second logical evaluation of said occupancy state and said second proximity state.

3. The apparatus of claim 2 wherein said first pressure detecting system, said first alerting system, and said second alerting system are each operated from energy provided by a battery and wherein said communications paradigm includes a power-conserving communications process.

4. The apparatus of claim 3 wherein said first alerting system includes a first periodic poll of said occupancy state and said first proximity state, wherein said second alerting system includes a second periodic poll of said occupancy state and said second proximity state and wherein said power-conserving communications process includes an implementation of a variable duty cycle controlling a frequency of said periodic polls.

5. The apparatus of claim 4 wherein said battery of said first pressure detecting system consists essentially of a coin cell battery, wherein an occupancy state of the safety seat includes 20 hour per week of active monitoring, and wherein said variable duty cycle is configured to achieve an estimated 20 months of operation of said first pressure detecting system.

6. An apparatus for detecting unattended occupancy, by a user, of a safety seat associated with a vehicle seat, comprising:

a first pressure detecting system, responsive to a mass of the user disposed within the safety seat, cooperatively physically coupled to the safety seat and the vehicle seat, said first pressure detecting system establishing an occupancy state for the safety seat; and an first alerting system, in a ranging association with said first pressure detecting system and responsive to said occupancy state, including a first portable electronic device evaluating a first separation distance between said first pressure detecting system and said first portable electronic device to establish a first proximity state for said first portable electronic device relative to said first pressure detecting system, said first alerting system providing a first indication responsive to a first indicator state that consists essentially of a first logical evaluation of said occupancy state and said first proximity state;

wherein said first pressure detecting system and said first alerting system employ a communications paradigm for exchanging data, and wherein said communications paradigm includes a client-server communications process;

wherein said first pressure detecting system includes a first car seat server, wherein said first alerting system includes a first client and further comprising a second pressure detecting system cooperatively physically coupled to a second safety seat and the vehicle seat, said second pressure detecting system establishing a second occupancy state for said second safety seat, wherein said second pressure detecting system includes a second car seat server, wherein said first alerting system, in said ranging association with said second car seat server and responsive to said second occupancy state, including said first portable electronic device evaluating a second separation distance between said second pressure detecting system and said first portable electronic device to establish a second proximity state for said first portable electronic device relative to said second pressure detecting system, said first alerting system providing a second indication, independent from said first indication, responsive to a second indicator state that consists essentially of a second logical evaluation of said second occupancy state and said second proximity state.

* * * * *